United States Patent
Markmann et al.

(10) Patent No.: US 7,646,159 B2
(45) Date of Patent: Jan. 12, 2010

(54) ELECTRICALLY COMMUTATED MOTOR AND METHOD FOR CONTROLLING SAID MOTOR

(75) Inventors: Matthias Markmann, Luenen (DE); Benedikt Schmuelling, Aachen (DE); Waldemar Stephan, Dortmund (DE)

(73) Assignee: Pierburg GmbH, Neuss (DE)

( * ) Notice: Subject to any disclaimer, the term of this patent is extended or adjusted under 35 U.S.C. 154(b) by 287 days.

(21) Appl. No.: 11/886,359

(22) PCT Filed: Feb. 10, 2006

(86) PCT No.: PCT/EP2006/050844

§ 371 (c)(1),
(2), (4) Date: Sep. 14, 2007

(87) PCT Pub. No.: WO2006/097393

PCT Pub. Date: Sep. 21, 2006

(65) Prior Publication Data

US 2008/0106226 A1 May 8, 2008

(30) Foreign Application Priority Data

Mar. 17, 2005 (DE) .................... 10 2005 012 859

(51) Int. Cl.
*H02P 6/00* (2006.01)

(52) U.S. Cl. ................... 318/400.01; 318/400.14; 318/254.1; 318/738

(58) Field of Classification Search ........... 318/400.01, 318/400.14, 254.1, 738
See application file for complete search history.

(56) References Cited

U.S. PATENT DOCUMENTS

| 4,963,808 A | * | 10/1990 | Torisawa et al. ............. 318/685 |
| 5,844,394 A | * | 12/1998 | Mushika et al. ............. 318/696 |
| 6,351,048 B1 | * | 2/2002 | Schob et al. ................ 310/90.5 |
| 7,026,773 B2 | * | 4/2006 | Petersen ................ 318/400.01 |
| 7,489,358 B2 | * | 2/2009 | Fujii .......................... 348/335 |
| 2004/0267421 A1 | | 12/2004 | Eskritt et al. .................. 701/41 |

FOREIGN PATENT DOCUMENTS

DE 198 45 626 A1 4/2000
DE 100 09 900 A1 9/2001

OTHER PUBLICATIONS

International Search Report issued May 4, 2006 by European Patent Office for Priority Application PCT/EP2006/050844.

* cited by examiner

*Primary Examiner*—Bentsu Ro
*Assistant Examiner*—Erick Glass
(74) *Attorney, Agent, or Firm*—Ohlandt, Greeley, Ruggiero & Perle, LLP

(57) ABSTRACT

An electrically commutated motor comprises a plurality of stator phases and a rotor. Further, sensors for detecting the control deviation of the rotor in relation to the stator phases are provided. A phase control unit controls the stator phase rotary field depending on the detected control deviation. The phase control unit comprises a single-phase controller for a single-phase mode of operation, and a multiple-phase controller for a multiple-phase mode of operation. Further, a control deviation evaluation element is provided which evaluates the magnitude of the control deviation, and selects, depending on the evaluation result, the single-phase mode of operation or the multiple-phase mode of operation.

5 Claims, 1 Drawing Sheet

ELECTRICALLY COMMUTATED MOTOR AND METHOD FOR CONTROLLING SAID MOTOR

BACKGROUND

1. Field of the Invention

The present disclosure relates to an electrically commutated motor and a method for controlling said electrically commutated motor which comprises a plurality of stator phases and a rotor.

2. Discussion of the Background Art

Control and regulation of an electrically commutated motor require a rotary field control depending on the rotary field of the permanently excited rotor of the motor. Known control strategies are the single-phase control and the multiple-phase control which are alternatively employed in electrically commutated motors. In the single-phase control, the control deviation is determined merely in relation to a single stator phase, the so-called master phase, and the stator phase rotary field is controlled depending on the control deviation. The control is performed depending on a single phase, and consequently with a 360° resolution. In the event of rotational speed changes or major disturbances, the single phase control may possibly not ensure an adequate operational reliability due to its coarseness, in particular at low rotational speeds and under load.

Although multiple-phase controls, where the phase deviation of each stator phase is included in the control, are by far a more close-meshed control, a multiple-phase control may offer a poor or sometimes even inadequate control accuracy in the so-called stationary state, i.e. at constant rotational speed and relatively small loads, due to mechanical manufacturing tolerances which may cause phase asymmetries of the stator, for example, or due to an inaccurate sensor positioning. This phenomenon has in particular been found in digital, i.e. not continuously controlling, control systems.

The present disclosure provides an electrically commutating motor with an improved control, and an improved method for controlling an electrically commutated motor.

SUMMARY

The electrically commutated motor of the present disclosure comprises sensors for detecting the control deviation of the rotor in relation to the stator phases. Further, a phase control for the stator phase rotary field depending on the detected control deviation is provided. The phase control includes both a single phase controller for a single-phase mode of operation and a multiple-phase controller for a multiple-phase mode of operation. Further, a control deviation evaluation element is provided which evaluates the magnitude of the control deviation, and selects the single-phase or the multiple-phase mode of operation depending on the evaluation result. The mode of operation is selected depending on the magnitude of the control deviation. At relatively small control deviations the single-phase mode of operation is selected, and at relatively large control deviations the multiple-phase mode of operation is selected. Thus, on the one hand, a high control stability, i.e. a high control accuracy, is ensured at a small control deviation and in particular at low rotational speeds, which results in a considerable improvement of the control accuracy in particular in digital control systems. In the single-phase mode of operation the control deviation of a single stator phase, the so-called master phase, is employed for control purposes. At larger control deviations the multiple-phase mode of operation is used in particular at lower rotational speeds. In the multiple-phase mode of operation all stator phases are evaluated. For each phase the control deviation is determined. A three-phase system offers a triple improvement of the resolution to 120°, for example. This allows the control to respond quickly enough, in particular at low rotational speeds, in order to prevent malfunctions.

If the control deviation falls below a specific value during and/or subsequent to a multiple-phase mode of operation, the multiple-phase mode of operation is changed back to the single-phase mode of operation.

The selection of the mode of operation, which is coupled with the control deviation, results in an improvement of the control stability in particular at low rotational speeds, a lower susceptibility to interference with regard to sudden load and voltage variations, a reduction of the parameter sensitivity, an improvement of the correction dynamics, i.e. the target speed is more quickly reached, for example, and an improvement of the degree of damping. Altogether, the control system is considerably more robust with regard to any kind of disturbances due to the selection of the mode of operation depending on the control deviation.

The single-phase controller and the multiple-phase controller may further be configured as a single unit in the form of either a physical component or software.

Preferably, the evaluation element has associated therewith a tolerance band memory for storing the tolerance values for the control deviation, wherein the evaluation element selects the single-phase mode of operation at phase deviations within the tolerance band, and the multiple-phase mode of operations at phase deviations outside the tolerance band. The tolerance band may be a constant or a non-constant band depending on parameters, such as the rotational speed. The tolerance band and/or the tolerance values can be determined by first determining the mechanically caused phase asymmetries for each phase, for example, which are virtually unavoidable due to inaccuracies of the stator phases, the sensors and other components. For this purpose, the maximum control deviation of all phases is first determined over the overall rotational speed range in the stationary state, i.e. without an external disturbances and at a constant target rotational speed. The tolerance band must be wide enough so that the physical asymmetries alone cannot cause any control deviations outside the tolerance band. The tolerance band width is determined by the control deviation caused by physical asymmetries plus a tolerance, for example.

According to a preferred embodiment, the evaluation element has associated therewith a delay element for delaying by a defined value the changeover from the multiple-phase mode of operation to the single-phase mode operation. The defined value may be a number of successive control deviations within the tolerance band, for example. This ensures that the multiple-phase mode of operation is maintained until a specific number of successive control deviations lies within the tolerance band. In a three-phase stator there may be four successive control deviations within the tolerance band, for example. Thus the stability of the control is improved and beat effects due to frequent changeovers between the two modes of operation are prevented.

The method for controlling an electrically commutated motor having a plurality of stator phases and a rotor comprises the following method steps:

detection of the control deviation of the rotor in relation to the stator phases, phase control of the stator phase rotary field depending on the detected control deviation, and selection between a single-phase mode of operation and a multiple-phase mode of operation depending on the magnitude of the control deviation.

The motor is not controlled strictly in a single mode of operation but flexibly in that mode of operation that is better suited for the control situation involved.

BRIEF DESCRIPTION OF THE DRAWINGS

An embodiment of the present disclosure will now be described in greater detail with reference to the drawing in which.

DETAILED DESCRIPTION OF THE PREFERRED EMBODIMENT

Figure 1:
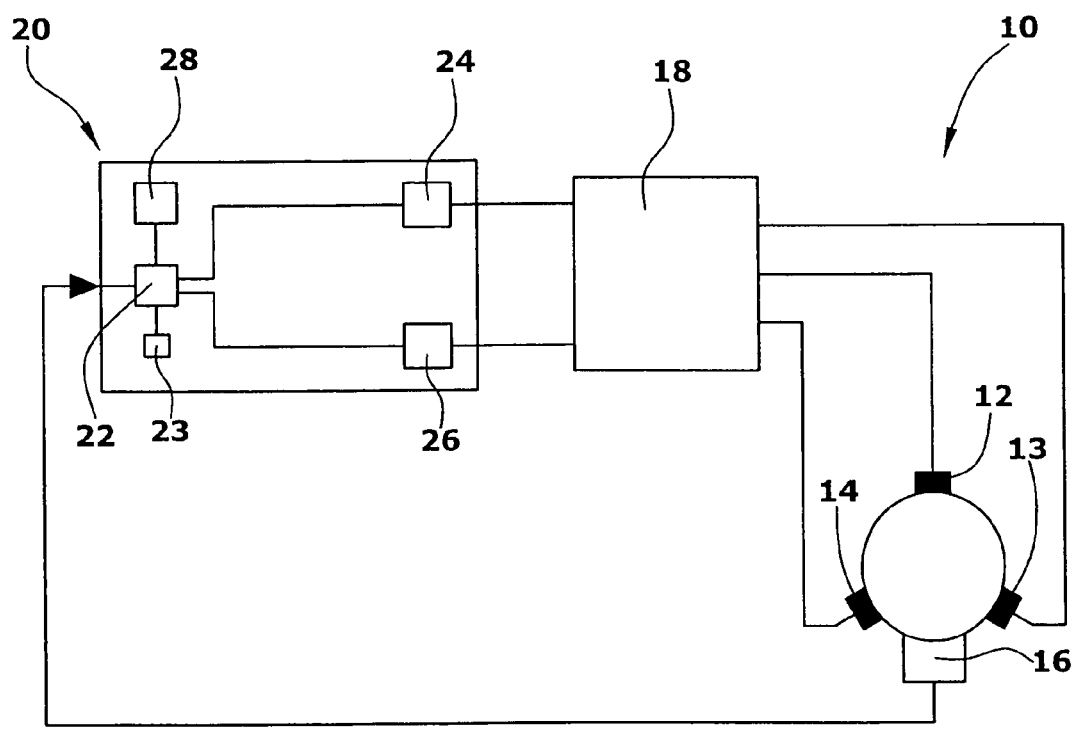
FIG. 1 shows a schematic representation of an electrically commutated motor including a phase control.

FIG. 1 schematically shows an electrically commutated motor 10 comprising three stator phases 12,13,14, a motor rotor which is not shown, sensors 16, a motor driver 18 and a phase control unit 20. The phase control unit 20 controls the stator phase rotary field depending on the control deviation detected by the sensors 16, i.e. the rotatory deviation of the rotor from its target position in relation to a stator phase 12 or a plurality of stator phases 12,13,14.

The phase control unit 20 comprises a plurality of elements, namely a control deviation evaluation element 22, a single-phase controller 24 for a single-phase mode of operation, a multiple-phase controller 26 for a multiple-phase mode of operation and a tolerance band memory 28.

In the tolerance band memory 28 tolerance values for the control deviation are stored. The tolerance values have been determined by determination of the control deviation in the so-called stationary state of the motor, i.e. at constant rotational speed and constant load without any further disturbances and with an additional tolerance over the overall rotational speed range of the motor.

Figure 2:
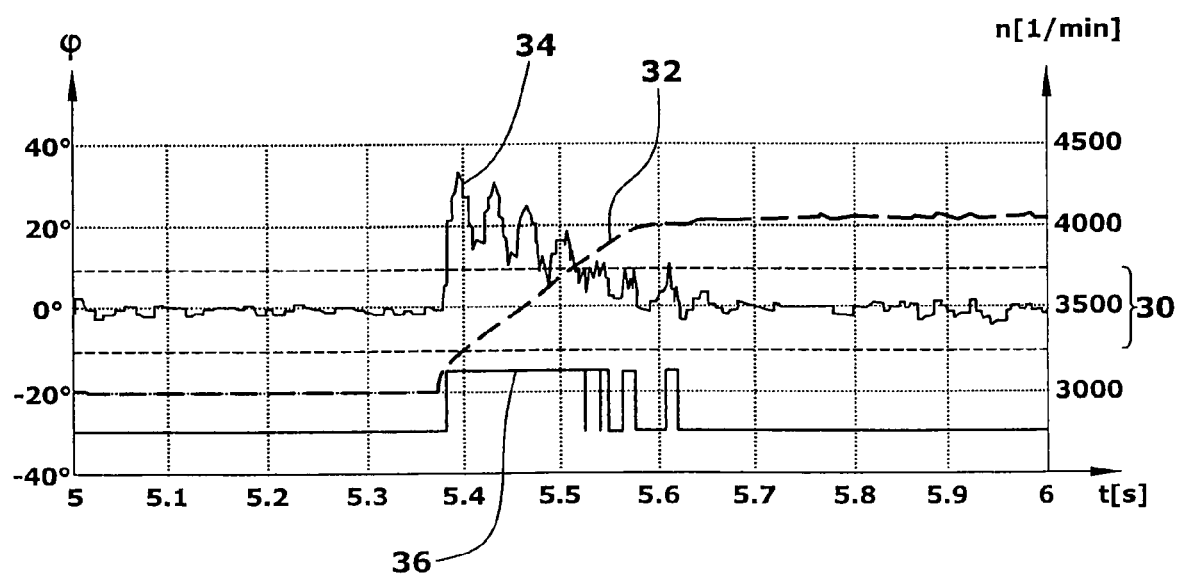
FIG. 2 shows a graphic representation of an exemplary time-dependent course of the mode of operation depending on the control deviation.

In FIG. 2 the thus determined tolerance band 30 is shown, which has a width of 20° in the present embodiment.

The evaluation element 22 has associated therewith a delay element 23 for delaying by a defined value the changeover from the multiple-phase mode of operation back to the single-phase mode of operation. This value represents a number of four successive control deviations within the tolerance band.

While in the single-phase mode of operation the control is based on the control deviation of a single stator phase 12, the so-called master phase, the control is based on the control deviation of all three stator phases 12,13,14 in the multiple-phase mode of operation. Thus the multiple-phase mode of operation offers a triple improvement of the resolution. This is of importance in particular at low speeds and the occurrence of a disturbance and/or a change in the target rotational speed.

In the technical practice, the two modes of operation differ from each other exclusively by the frequency of employment, and by consideration of the control deviation of a single phase or of all phases. In the single-phase mode of operation the results of the calculated control deviations of the non-master phases are ignored insofar as the controller is exclusively employed at the time of the calculated control deviation of the master phase. Although the control deviations of the remaining phases are determined, they are not evaluated. The controller is not active at these times.

FIG. 2 shows by way of example a change in the target rotational speed, the resultant control deviation, and the mode of operation resulting from the latter. The rotational speed curve is designated by the reference numeral 32, the control deviation curve is designated by the reference numeral 34, and the mode of operation curve is designated by the reference numeral 36. As can be seen, the control deviation remains within the tolerance band 30 at a constant rotational speed. Only when the target rotational speed is changed, the control deviation leaves the tolerance band 30 such that the evaluation element 22 changes over the mode of operation from the single-phase mode of operation to the multiple-phase of operation after the measured control deviation has been compared with the tolerance band stored in the tolerance band memory 28, and after detection that the tolerance band has been exceeded. When the control deviation lies within the tolerance band 30 four times in succession, i.e. in relation to four successive stator phases 12,13,14, the mode of operation is changed back to the single-phase mode of operation. As soon as the target rotational speed is reached and stabilized, the control deviation again continuously remains within the tolerance band 30, and the motor is constantly operated and controlled in the single-phase mode of operation.

What is claimed is:

1. An electrically commutated motor comprising a plurality of stator phases and a rotor, and having sensors for detecting the control deviation of said rotor in relation to said stator phases, and
    a phase control unit for controlling the stator phase rotary field depending on the detected control deviation,
    characterized in that
    the phase control unit comprises a single-phase controller for a single-phase mode of operation, and a multiple-phase controller for a multiple-phase mode of operation, and
    a control deviation evaluation element is provided which evaluates the magnitude of the control deviation, and selects, depending on evaluation result, the single-phase mode of operation or the multiple-phase mode of operation.

2. The electrically commutated motor according to claim 1, wherein said evaluation element has associated therewith a tolerance band memory for storing tolerance values for the control deviation, wherein the evaluation element selects the single-phase mode of operation when phase deviations occur within the tolerance band, and the multiple-phase mode of operation when phase deviations occur outside said tolerance band.

3. The electrically commutated motor according to claim 1, wherein said evaluation element has associated therewith a delay element for delaying, by a defined value, the changeover from the multiple-phase mode of operation to the single-phase mode of operation.

4. The electrically commutated motor according to claim 3, wherein said defined value represents a number of successive control deviations within the tolerance band.

5. A method for controlling an electrically commutated motor having a plurality of stator phases and a rotor, the method comprising the following method steps:
    detection of the control deviation of the rotor in relation to the stator phases,
    phase control of the stator phase rotary field depending on the detected control deviation, and
    selection between a single-phase mode of operation and a multiple-phase mode of operation depending on the magnitude of the control deviation.

* * * * *